(12) United States Patent
Wang

(10) Patent No.: US 7,044,484 B2
(45) Date of Patent: May 16, 2006

(54) FOLDING ANCHOR STRUCTURE FOR FOLDABLE HAND TRUCKS

(76) Inventor: Wen-Fa Wang, No.388, Zili Rd., Wuqi Town, Taichung County (TW)

( * ) Notice: Subject to any disclaimer, the term of this patent is extended or adjusted under 35 U.S.C. 154(b) by 0 days.

(21) Appl. No.: 10/873,204

(22) Filed: Jun. 23, 2004

(65) Prior Publication Data

US 2005/0285359 A1    Dec. 29, 2005

(51) Int. Cl.
  *B62B 1/00*    (2006.01)
(52) U.S. Cl. ............... 280/47.27; 280/40; 280/47.315; 280/47.29
(58) Field of Classification Search .................. 280/40, 280/47.315, 35, 38, 47.17, 47.18, 47.24, 280/47.27, 47.29, 42, 63, 655, 638, 641, 280/645, 646, 651, 652, 654
See application file for complete search history.

(56) References Cited

U.S. PATENT DOCUMENTS

| | | | |
|---|---|---|---|
| 3,043,603 A * | 7/1962 | Major, Sr. ................... 280/40 |
| 3,659,867 A * | 5/1972 | Curry ......................... 280/645 |
| 4,185,853 A * | 1/1980 | Thurmond, Jr. ............. 280/652 |
| 4,448,434 A * | 5/1984 | Anderson ..................... 280/40 |
| 5,549,317 A * | 8/1996 | Dunkle ........................ 280/652 |
| 5,803,471 A * | 9/1998 | DeMars et al. ............... 280/40 |
| 5,984,327 A * | 11/1999 | Hsieh et al. ............. 280/47.24 |
| 6,131,927 A * | 10/2000 | Krawczyk ................ 280/47.29 |
| 6,425,599 B1 * | 7/2002 | Tsai ............................ 280/652 |
| RE38,436 E * | 2/2004 | Su ............................... 280/40 |
| 6,685,214 B1 * | 2/2004 | Gregory ..................... 280/652 |

* cited by examiner

*Primary Examiner*—Hau Phan
(74) *Attorney, Agent, or Firm*—Birch, Stewart, Kolasch & Birch, LLP

(57) ABSTRACT

A folding anchor structure for foldable hand trucks includes a loading board and a wheel set foldable simultaneously on two sides of a frame and a latch lever on a handle to latch the loading board in a folded and shrunk condition when the handle is retracted to prevent the loading board and the wheel set from loosening off from the folded condition and causing harmful effect.

10 Claims, 5 Drawing Sheets

FOLDING ANCHOR STRUCTURE FOR FOLDABLE HAND TRUCKS

FIELD OF THE INVENTION

The present invention relates to a folding anchor structure for foldable hand trucks and particularly to an anchor structure to prevent a foldable hand truck from breaking loose from the folded condition.

BACKGROUND OF THE INVENTION

A conventional hand truck for hauling luggage such as the one shown in FIG. 1 generally has a U-shape handle 1 of a selected height and a loading board 2 coupling to the bottom end of the handle 1. There are two wheels 3 coupled to the left and the right sides of the bottom ends of the handle 1. The lower sides of the U-shape handle 1 further are bridged by a transverse bracing bar 4. Luggage may be held on the loading board 2 and lean against the handle 1 and the bracing bar 4. However, such a structure cannot be folded in a smaller size on the front and rear sides when not in use. It takes too much floor space and is difficult to store.

To remedy this problem, a folding hand truck has been developed as shown in FIG. 2. It has a loading board 5 to couple with a wheel 6 through a gear seat 7 so that they may be driven simultaneously and folded on two sides of a frame 8. While it may save space for storing when not in use, it does not have any means to prevent the folded hand truck from breaking loose. The loading board 5 or the wheel 6 of the loosening hand truck could extend outwards and hurt people walking around. It has safety concern that needs be improved.

SUMMARY OF THE INVENTION

Therefore the primary object of the invention is to provide a folding anchor structure for foldable hand trucks to prevent a folded hand truck from breaking loose and causing harmful effect.

The invention includes a frame, a loading board, a wheel set and a handle. The loading board and the wheel set are coupled on two sides of the frame through a gear set so that they may be driven simultaneously and folded on two sides of the fame. The handle is extendable and retractable on the frame to shrink the size of the handle truck to facilitate storing. There is a latch lever on the handle to latch on one side of the loading board in the folded and shrunk condition so that the loading board may be prevented from loosening off and hurting people walking around.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art train this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
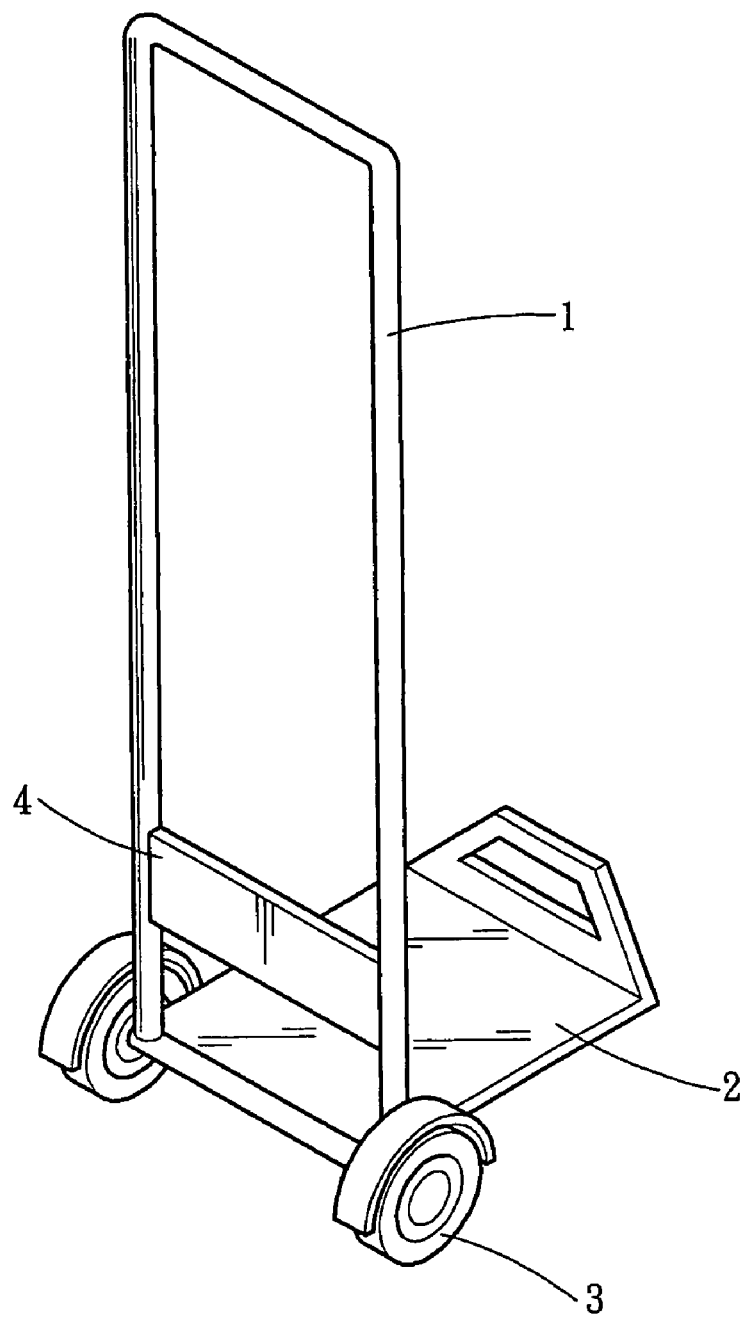
FIG. 1 is a perspective view of a conventional hand truck.
Figure 2:
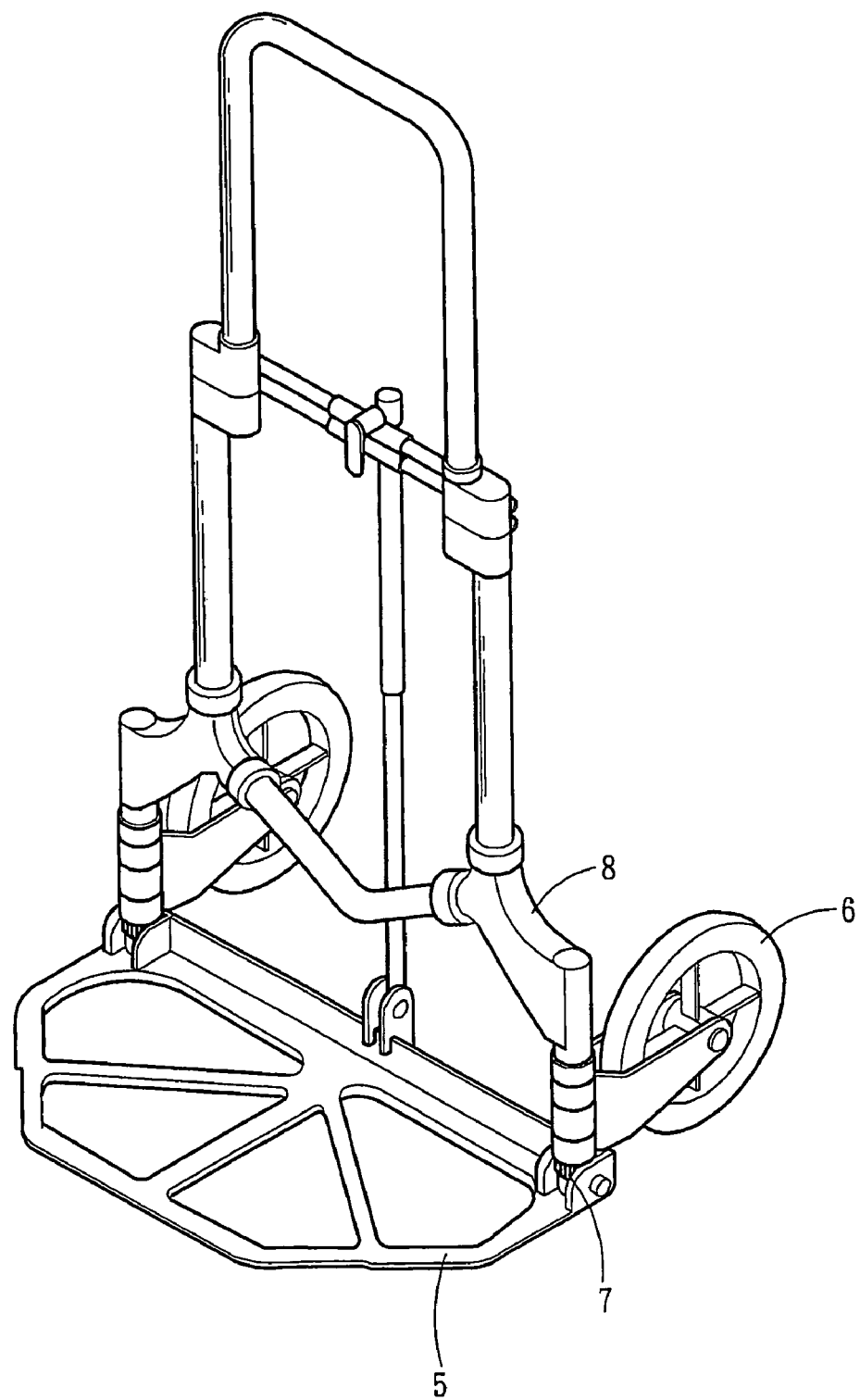
FIG. 2 is a perspective view of a conventional folding hand truck.
Figure 3:
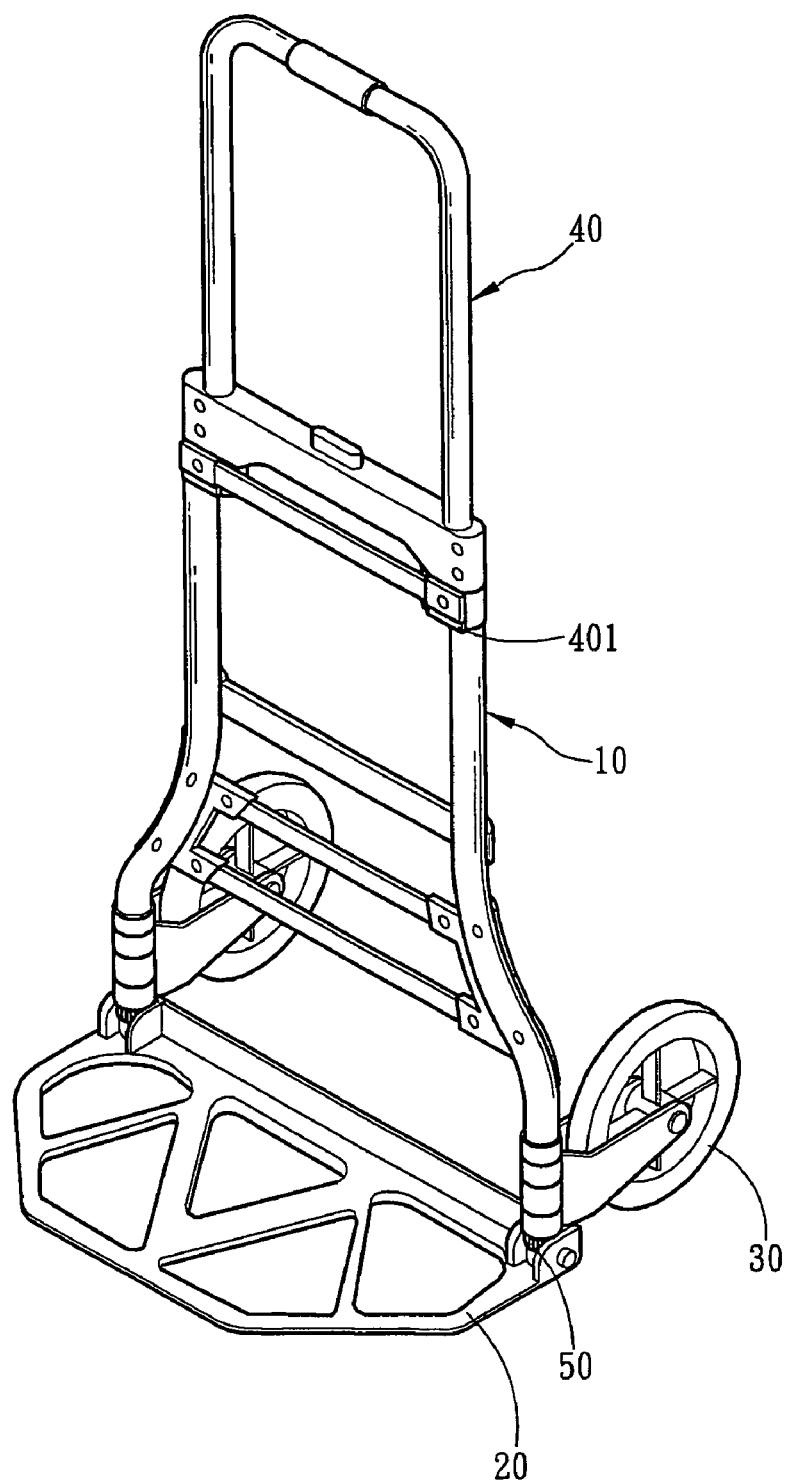
FIG. 3 is a perspective view of the present invention.
Figure 4A:
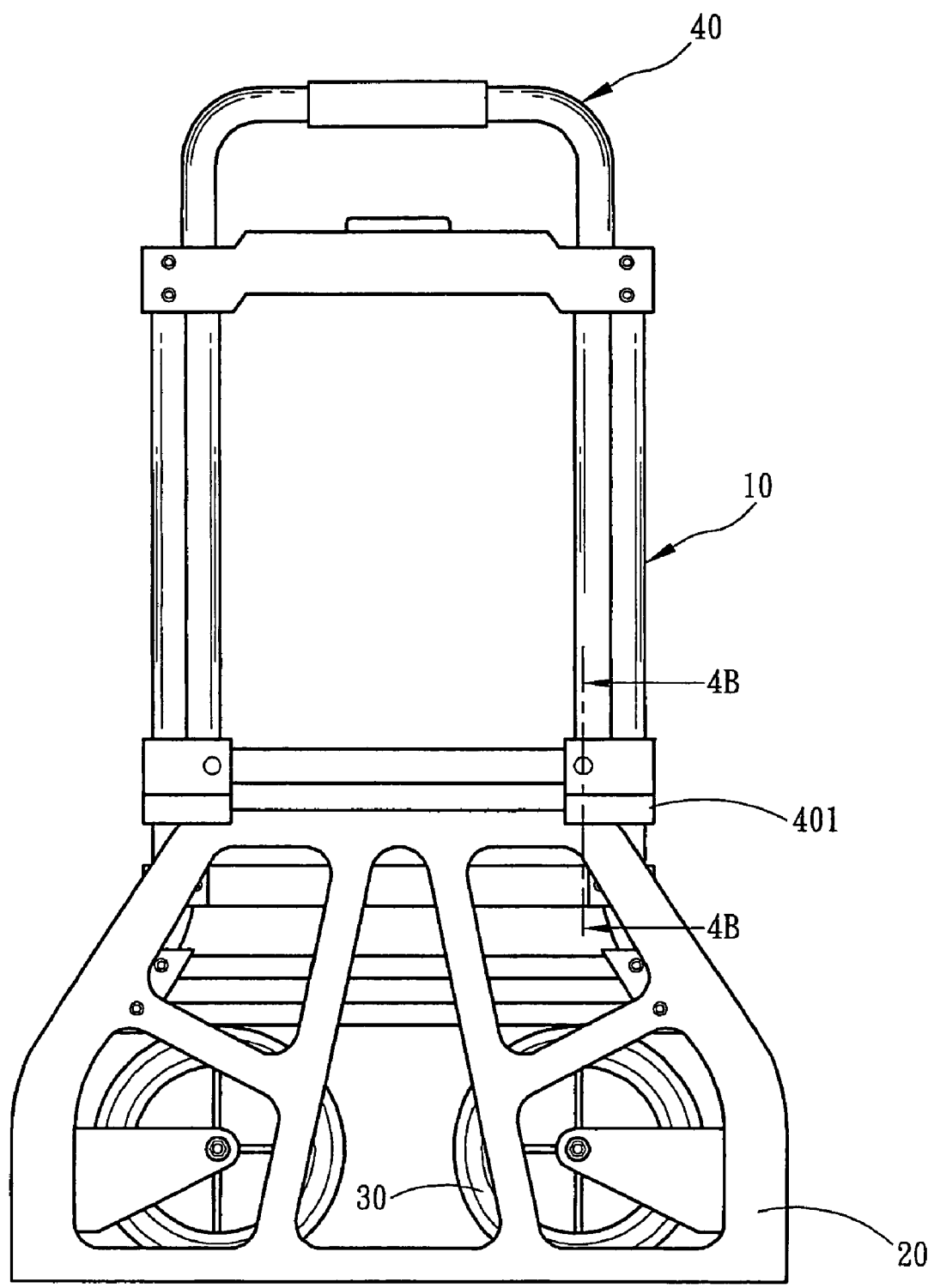
FIG. 4A is a plain view of the invention in a folding condition.

Please referring to FIGS. 3 and 4A, the hand truck according to the present invention includes a frame 10, a loading board 20 and a wheel set 30 located on two sides of the frame 10, and a handle 40 coupled on an upper side of the frame 10. The loading board 20 and the wheel set 30 are coupled through a gear set 50 so that they may be driven simultaneously by the gear set 50 and folded on two sides of the fame 10. The handle 40 is extendable and retractable on the frame 10 to shrink the size of the handle truck to facilitate storing.

Figure 4B:
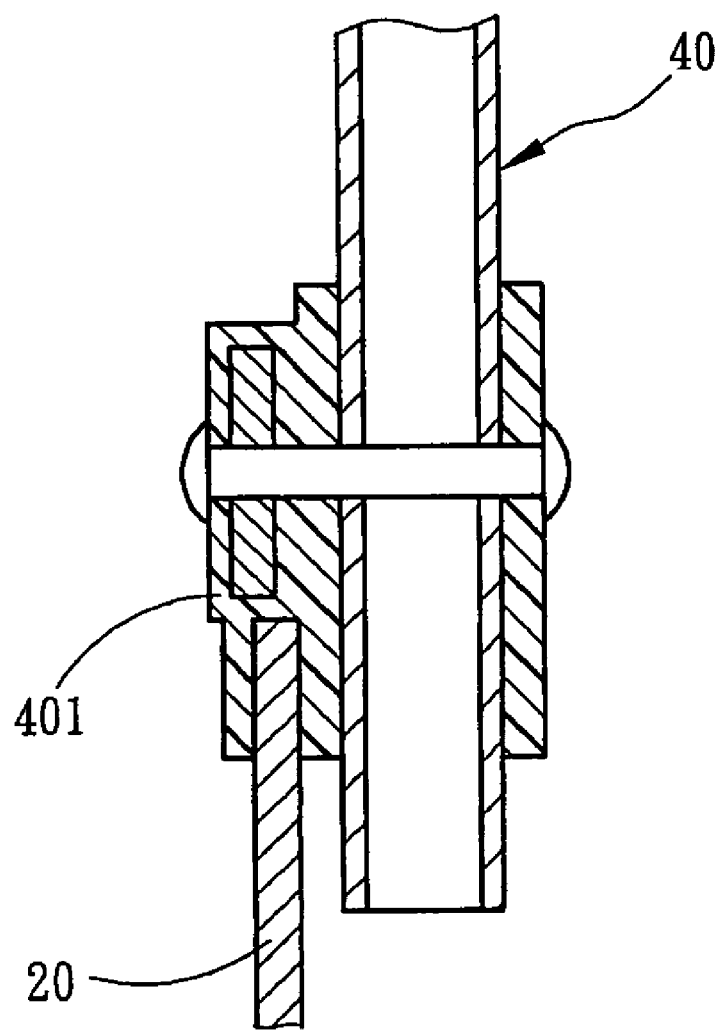
FIG. 4B is a cross section taken on line 4B—4B in FIG. 4A.

There is a latch lever 401 on the handle 40. When the handle 40 is retracted on the frame 10 as shown in FIG. 4B, the latch lever 401 may latch on one side of the loading board 20 so that the loading board 20 and the wheel set 30 are prevented from loosening off from the folded condition and extending outside on the hall way and hurting people walking around.

To improve the stability of the latch lever 401, the latch lever 401 has two sets located on two sides of the handle 40 to latch two edges of the loading board 2 on the frame 10 in the folded and shrunk condition.

As the loading board 20 and the wheel set 30 are driven simultaneously by the gear set 50 to fold or unfold, once the loading board 20 is latched and anchored by the latch lever 401, the wheel set 30 also is latched and anchored without loosening off.

The invention being thus described, it will be obvious that the same may be varied in many ways. Such variations are not to be regarded as a departure from the spirit and scope of the invention, and all such modifications as would be obvious to one tiled in the art are intended to be included within the scope of the following claims.

What is claimed is:

1. A foldable hand truck comprising a folding anchor structure, a frame, a loading board, a wheel set and a handle, the loading board and the wheel set being driven simultaneously by a gear set to be folded on two sides of the frame, the handle being extendable and retractable on the frame;
   wherein the folding anchor structure mounted to an end portion of the handle, the folding anchor structure includes a latch lever to latch the loading board on one side of the frame in a folded and shrunk condition when the handle is retracted and to release the loading board in response to the handle being extended,
   wherein the latch lever of the folding anchor structure includes latches which are located at opposed sides of the handle and which engage opposed sides of a front end of the loading board.

2. The foldable hand truck of claim 1, wherein the latch lever of the folding anchor structure has two sets located on two sides of the handle.

3. The foldable hand truck of claim 1, wherein the handle is longitudinally reciprocated when extended and retracted.

4. The foldable hand truck of claim 3, wherein the loading board is pivotable about an axis which is generally perpendicular to a direction in which the handle is longitudinally reciprocated.

5. The foldable hand truck of claim 4, wherein the wheel set includes two wheels which rotate about axes which are generally parallel to the direction in which the handle is longitudinally reciprocated.

6. The foldable hand truck of claim 1, wherein the latch lever includes a recess which receives a front end of the loading board when the handle is retracted.

7. The foldable hand truck of claim 1, wherein the loading board has a front end and a rear end, the rear end of the loading being pivotally attached to the handle and wherein the front end of the loading board is received in a recess provided in the latch lever.

8. The foldable hand truck of claim 1, wherein the latch lever includes a recess into which a front end of the loading board slides during retraction of the handle.

9. The foldable hand truck of claim 8, wherein the latch lever includes latches which are located at opposed sides of the handle, each of the latches having a recess which receives the front end of the loading board upon retraction of the handle.

10. The foldable hand truck of claim 9, wherein the latches are located on lateral outer sides of the handle and are movable with the handle during extension and retraction of the handle.

* * * * *